United States Patent [19]

Benson et al.

[11] Patent Number: 5,477,676
[45] Date of Patent: Dec. 26, 1995

[54] METHOD AND APPARATUS FOR THERMAL MANAGEMENT OF VEHICLE EXHAUST SYSTEMS

[75] Inventors: David K. Benson, Golden; Thomas F. Potter, Denver, both of Colo.

[73] Assignee: Midwest Research Institute, Kansas City, Mo.

[21] Appl. No.: 188,394

[22] Filed: Jan. 27, 1994

Related U.S. Application Data

[63] Continuation-in-part of Ser. No. 960,885, Oct. 14, 1992, Pat. No. 5,318,108, which is a continuation-in-part of Ser. No. 856,840, Mar. 23, 1992, Pat. No. 5,175,975, which is a continuation of Ser. No. 181,926, Apr. 15, 1988, abandoned, said Ser. No. 960,885, Oct. 14, 1992, a continuation-in-part Ser. No. 535,782, Jun. 12, 1990, Pat. No. 5,157,893, which is a continuation-in-part of Ser. No. 181,926, Apr. 15, 1988, abandoned.

[51] Int. Cl.⁶ ..................................................... F01N 3/20
[52] U.S. Cl. .............................. 60/274; 60/300; 60/303; 165/96
[58] Field of Search ............................. 60/272, 273, 274, 60/300, 302, 303; 165/96 HV

[56] References Cited

U.S. PATENT DOCUMENTS

| | | | |
|---|---|---|---|
| 3,151,365 | 10/1964 | Glaser et al. | 20/4 |
| 3,152,033 | 10/1964 | Black et al. | 161/50 |
| 3,161,265 | 12/1964 | Matsch et al. | 189/34 |
| 3,167,159 | 1/1965 | Bovenkerk | 189/34 |
| 3,168,806 | 2/1965 | Calvert | 60/286 |
| 3,450,196 | 6/1969 | Bauer | 165/32 |
| 3,457,723 | 7/1969 | Kerns | 60/29 |
| 3,578,068 | 5/1971 | Elliot et al. | 165/39 |
| 3,606,753 | 9/1971 | La Force | 60/30 |
| 3,665,711 | 5/1972 | Muroki | 60/286 |
| 3,747,346 | 7/1973 | Onoda et al. | 60/286 |
| 3,830,288 | 8/1974 | Laing | 165/32 |
| 3,920,953 | 11/1975 | Laing | 165/196 HV |
| 3,986,665 | 10/1976 | Kofink | 165/196 HV |
| 4,224,980 | 9/1980 | Buchner | 165/32 |
| 4,235,956 | 11/1980 | Gross et al. | 429/112 |
| 4,304,294 | 12/1981 | Reisman et al. | 165/32 |
| 4,327,162 | 4/1982 | Borger | 429/120 |
| 4,345,430 | 8/1982 | Pallo et al. | 60/282 |
| 4,383,013 | 5/1983 | Bindin et al. | 429/112 |
| 4,683,154 | 7/1987 | Benson et al. | 428/34 |
| 4,770,004 | 9/1988 | Lagodmos | 62/383 |
| 5,031,401 | 7/1991 | Hinderks | 60/302 |
| 5,092,122 | 3/1992 | Bainbridge | 60/272 |
| 5,163,289 | 11/1992 | Bainbridge | 60/274 |
| 5,173,267 | 12/1992 | Maus et al. | 422/179 |

FOREIGN PATENT DOCUMENTS 683855 12/1952 United Kingdom .

OTHER PUBLICATIONS

"Use of Light–Off Catalysts to Meet the California LEV/ULEV Standarts" by J. C. Summers, J. F. Skowron, and M. J. Miller, Society of Automotive Engineers (SAE), Warrendale, Pa., date May 1985.

"Latent heat storage", Automotive Engineering publication date Feb. 1992.

"Heating System Utilizing Exhaust Heat with Emphasis on Defrosting Performance" by Teruo Ida, Noritoshi Hasumi, and Takeo Shimazaki, SAE Technical Paper Series, Warrendale, Pa., date May 1985.

Primary Examiner—James C. Yeung
Assistant Examiner—Daniel J. O'Connor
Attorney, Agent, or Firm—Edna M. O'Connor

[57] ABSTRACT

A catalytic converter is surrounded by variable conductance insulation for maintaining the operating temperature of the catalytic converter at an optimum level, for inhibiting heat loss when raising catalytic converter temperature to light-off temperature, for storing excess heat to maintain or accelerate reaching light-off temperature, and for conducting excess heat away from the catalytic converter after reaching light-off temperature. The variable conductance insulation includes vacuum gas control and metal-to-metal thermal shunt mechanisms. Radial and axial shielding inhibits radiation and convection heat loss. Thermal storage media includes phase change material, and heat exchanger chambers and fluids carry heat to and from the catalytic converter.

46 Claims, 7 Drawing Sheets

METHOD AND APPARATUS FOR THERMAL MANAGEMENT OF VEHICLE EXHAUST SYSTEMS

CONTRACTUAL ORIGIN OF THE INVENTION

The United States Government has rights in this invention under Contract No. DEAC0283CH10093 between the U.S. Department of Energy and the National Renewable Energy Laboratory, a Division of Midwest Research Institute.

BACKGROUND OF THE INVENTION

1. Related Patent Applications

This patent application is a continuation-in-part of pending U.S. patent application Ser. No. 07/960,885 filed on Oct. 14, 1992, now U.S. Pat. No. 5,318,108 which is a continuation-in-part of U.S. patent application Ser. No. 07/856,840 filed on Mar. 23, 1992, (now U.S. Pat. No. 5,175,975), which is a continuation of U.S. patent application Ser. No. 07/181,926, filed on Apr. 15, 1988, now abandoned, and U.S. patent application Ser. No. 07/960,885 is also a continuation-in-part of U.S. patent application Ser. No. 07/535,782, filed on Jun. 12, 1990, (now U.S. Pat. No. 5,157,893) which is a continuation-in-part of U.S. patent application Ser. No. 07/181,926 filed on Apr. 15, 1988, now abandoned.

2. Field of the Invention

This invention relates generally to automotive exhaust systems and particularly to systems for managing and utilizing heat generated in catalytic converters.

3. State of the Prior Art

Most vehicle exhaust systems and particularly exhaust systems of vehicles powered by gasoline-fueled internal combustion engines are equipped with catalytic converters for reducing noxious emissions in exhaust gases. The most effective current technology catalytic converters comprise ceramic substrates coated with one or more noble metal catalysts, such as platinum, palladium, or rhodium. The preferred noble metal for high temperature hydrocarbon reduction is palladium, and rhodium is effective for improving nitrous oxide and carbon monoxide emissions. So called 3-way catalytic converters typically include combinations of these noble metals that catalyze two oxidation reactions which oxidize carbon monoxide to carbon dioxide and oxidize hydrocarbons to carbon dioxide and water. At the same time, nitrogen oxides are reduced to nitrogen and oxygen. These reactions are very effective at certain high temperatures. However, until the catalyst is warmed up to its light-off temperature, defined as the temperature required to oxidize 50% of the hydrocarbons, the effectiveness of catalytic converters is very low. For Example, J. C. Summers et al., in their paper "Use of Light-Off Catalysts to Meet the California LEV/ULEV Standards," Catalysts and Emission Technology, Society of Automotive Engineers Special Publication No. 968, Warrendale, Pa., 1993, reported that roughly 60–80% of the tailpipe hydrocarbon emissions occur during the initial cold start (Bag 1) phase.

To reach light-off temperature more quickly, it is desirable to retain exhaust heat as much as possible in the catalytic converter, at least until the light-off temperature, usually in the range of about 600°–800° F., is reached. Providing an insulation jacket around the catalytic converter can help to retain heat. However, the temperature of a catalytic converter during extended operation once the light-off temperature is reached can rise very rapidly from the exothermic heat of the catalytic reactions with the exhaust gases. If the heat generated during extended operation or from fuel-rich gases reacted in the catalytic converter cannot be dissipated efficiently, it can build up to a point that accelerated aging of the catalyst or even permanent damage to the catalytic converter or to adjacent components or objects can result. Therefore, the maximum desired operating range is usually about 1,500° F. This problem was addressed by the U.S. Pat. No. 5,163,289, issued to D. Bainbridge, which discloses an insulation jacket around a catalytic converter wherein the insulation is a refractory fiber that conducts heat better at higher temperatures than at lower temperatures. While that approach was a start in a helpful direction, better control and more effective thermal management of catalytic converters is still needed for further reducing exhaust emissions and for utilizing heat produced in catalytic converters.

SUMMARY OF THE INVENTION

Accordingly, it is a general object of the present invention to provide a better catalytic converter heat management system for reducing and in some conditions even eliminating the time required to reach light-off temperature in motor vehicle exhaust catalytic converter systems while preventing excess heat build up during extended operating conditions.

It is another object of the present invention to provide adequate heat shielding around catalytic converters in motor vehicle exhaust systems to protect adjacent or nearby temperature-sensitive materials and components during extended periods of hot operation.

It is another object of the present invention to enable dumping or dissipating heat safely from catalytic converters in motor vehicle exhaust systems under conditions when excessive heat build up and temperatures threaten the continued effective life of the catalytic converter.

Another object of this invention is to provide structures and methods for managing heat generated in catalytic converters in efficient and useful applications.

A more specific object of this invention is to provide a controllable insulation and energy converter jacket for a catalytic converter that can be used to retain heat and maintain catalyst temperatures above the light-off temperature for extended periods of time and decreasing the time to reach light-off temperature in conditions when light-off temperature cannot be maintained, protect catalytic converter materials and surrounding components or environments from excessive heat and temperature build up, stabilize operating temperatures of catalytic converters and other exhaust system components, and put heat generated in catalytic converters to more beneficial uses.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, an exhaust management system is provided comprising variable and controllable insulation around the catalytic converter that can be turned on to maintain heat in the catalytic converter when no exhaust gases are being reacted in the catalytic converter or when the temperature of the catalytic converter is less than the optimum or light-off temperature, but which can be turned off when the temperature of the catalytic converter rises above the optimum or light-off temperature. The insulation can preferably also be maintained in a state or in a variety of states between on and off to moderate temperatures in a catalytic converter assembly. The variable and controllable insulation can be a vacuum insulation with gas or solid conduction control capability for selectively enabling or disabling the insulation. A heat exchanger can be provided to conduct heat away from or to the catalytic converter, and the heat exchanger can be jacketed by compact vacuum insulation to help retain heat during times when the variable conductance insulation is turned on.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DESCRIPTION OF THE PREFERRED EMBODIMENT

Figure 1:
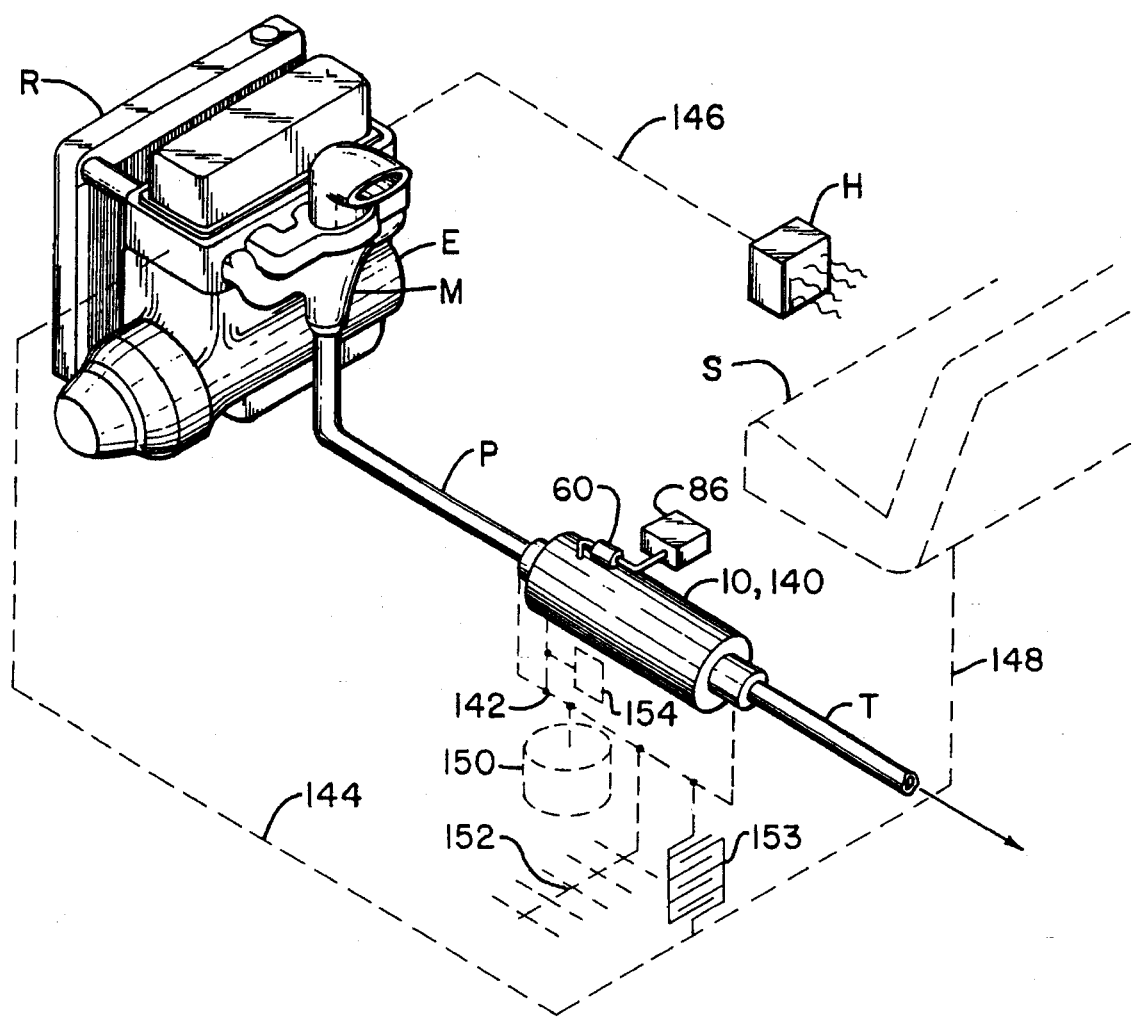
FIG. 1 is a schematic representation of a catalytic converter heat management system according to the present invention.

A catalytic converter 10 constructed with a heat management system according to this invention is shown in FIG. 1 mounted in an exhaust pipe P, which is connected to the exhaust manifold M of an internal combustion engine E of a motor vehicle (not shown). The exhaust pipe P carries exhaust gases from the engine E to the catalytic converter 10, which may contain conventional 3-way catalysts for reacting noncombusted fuel in the exhaust gases and reducing emissions of hydrocarbons, carbon monoxide, and nitrous oxides in the exhaust gases. The reacted exhaust gases are then discharged through a tailpipe T, usually at the rear-end of the motor vehicle (not shown).

Figure 2:
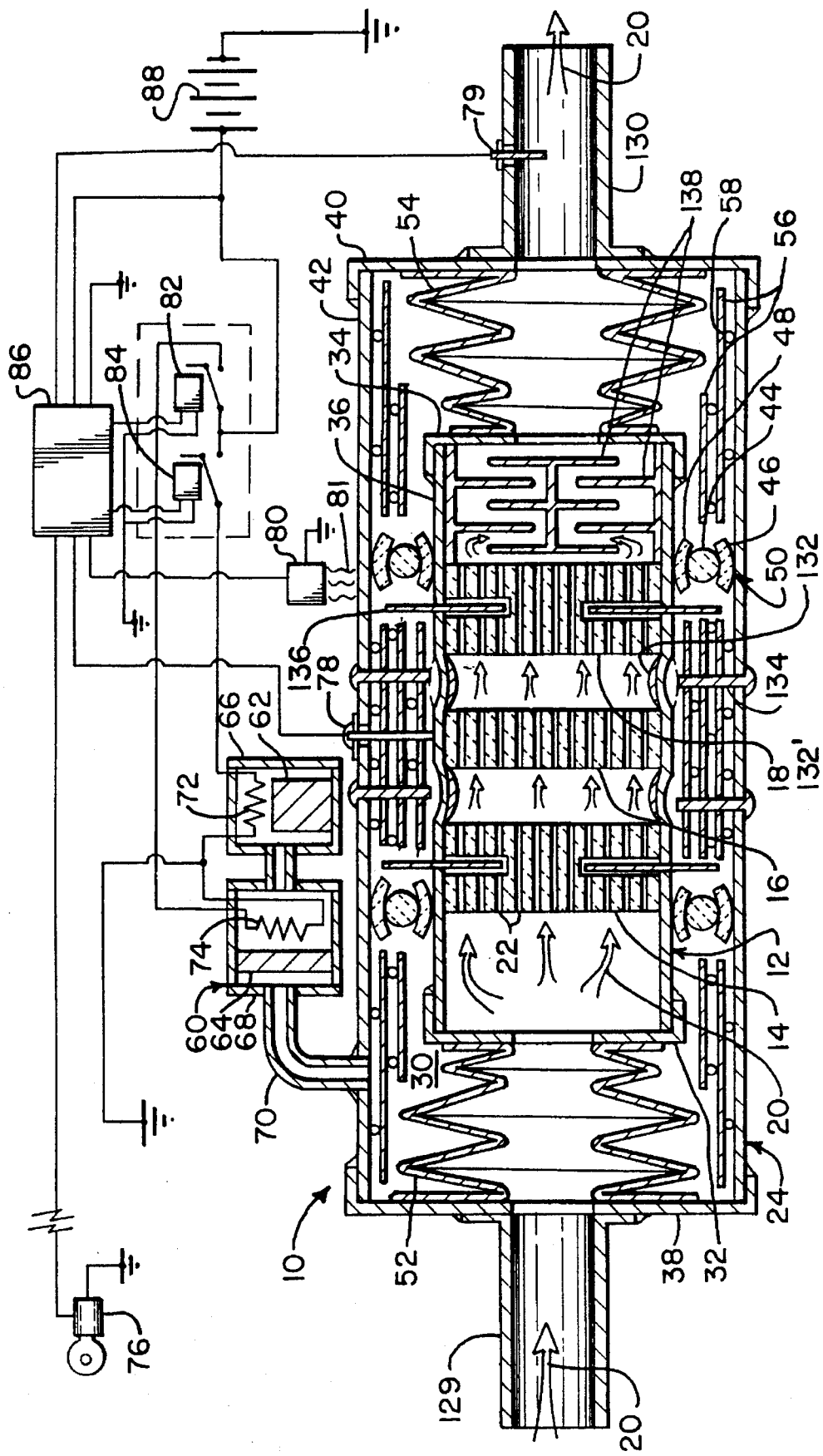
FIG. 2 is a cross-sectional view of a catalytic converter housing structured to provide heat management according to this invention.

Referring now to FIG. 2, the catalytic converter 10 according to this invention comprises an internal catalyst housing 12, preferably fabricated of metal or other material that is impermeable to gases, for containing one or more catalyst substrates 14, 16 and 18, which can be ceramic materials coated with 3-way catalyst material, such as platinum, palladium, and/or rhodium. Exhaust gases from the engine E (FIG. 1) flow through the catalytic converter 10, as indicated by the arrows 20 in FIG. 2, including through the numerous small, catalyst-coated pores or channels 22 that are formed in the ceramic substrates 14, 16, and 18 to increase the exposed surface area of the catalyst.

The internal catalyst housing 12 is enclosed within an outer housing 24 that is positioned at a distance spaced radially outward from the inner catalyst housing 12. The outer housing 24, like the inner housing 12, is preferably fabricated of metal or other material that is impervious to gas, even in a hot and high-order vacuum environment. The annular chamber 30 enclosed between the inner housing 12 and outer housing 24 is evacuated. The insulating performance of chamber 30 is preferably variable in a controllable manner, as will be described in more detail below. Suffice it to say at this point that the thermal insulating effect of chamber 30 can be enabled to inhibit transfer of heat from the catalyst substrates 14, 16, and 18 out of the inner housing 12 to the outer housing 24 to prevent it from dissipating to the surrounding environment, or it can be disabled to allow such heat transfer and thereby to "dump" heat from the catalyst reaction of exhaust gases into the surrounding environment. It can also be preferably enabled or disabled to varying degrees between fully enabled or fully disabled, depending on the heat conductance or insulative capacity needed at any time. Therefore, the insulating chamber 30 can be enabled to retain heat in the catalyst substrates 14, 16, and 18, for example upon starting the engine, to shorten the time required for the catalyst to reach light-off or optimum operating temperature. It can then be disabled when the catalyst reaches an optimum operating temperature to prevent excessive heat build up and high temperatures that could damage the substrates 14, 16, and 18 or shorten the useful life of the catalyst material coated on the substrates 14, 16, and 18. Perhaps more importantly, however, the insulation chamber 30 can be enabled when the engine is turned off to hold the heat in the catalyst substrates 14, 16, and 18 for as long as possible in order to keep the temperature above the light-off temperature of the catalyst until the next time the engine is started, or at least to keep the substrates 14, 16, and 18 above ambient temperature to minimize the time it takes to raise the catalyst to light-off temperature the next time the engine is started.

Such variable conductance insulation and methods and apparatus for controlling the thermal transfer capabilities are illustrated and described in detail in our U.S. patent application Ser. No. 07/960,885, which is incorporated herein by reference. Essentially, the vacuum chamber 30 is sealed from the inside of inner housing 12 where the exhaust gases flow through the catalyst substrates 14, 16, and 18, and it is sealed from the environment exterior to the outer housing 24. Exactly how such sealing is accomplished is not necessarily limited to any particular technique. However, for a long-lasting seal, it is preferred that the seal be made by metal-to-metal welds. For example, as illustrated in FIG. 2, the inner housing 12 can comprise inner end plates 32 and 34 welded to opposite ends of a cylindrical sidewall 36. The outer housing 24 similarly comprises outer end plates 38 and 40 welded to opposite ends of the outer cylindrical sidewall 42. The outer cylindrical wall 42 is held apart from the inner cylindrical wall 36 by plurality of spacers 50, preferably made of a low heat conducting material, such as ceramic, shaped with curved or pointed surfaces that form thermal resistance nodes that minimize the areas of surface contacts through which heat can be conducted from the inner housing 12 to the outer housing 24. For example, as shown in FIG. 2, the spacers 50 can comprise spherical ceramic beads 44 positioned between two curved ceramic liners 46 and 48, thereby forming a series of four "near point," i.e. very small, ceramic to ceramic surface contact areas or thermal resistance nodes between the inner housing 12 and outer housing 24. Two of the thermal resistance nodes are where the curved outer surfaces of the liners 46, 48 contact respective inner cylindrical housing wall 36 and outer sidewall 42. Two more of the thermal resistance nodes are where the diametrically opposite sides of the spherical beads 44 contact the inside surfaces of the respective liners 46 and 48. Of course, the curved liners 46 and 48 are not required, but they increase the resistance to heat flow through the spherical beads 44. Also, the beads 44 could be elongated strands wrapped around the inner housing 12, but that configuration would provide a greater contact surface area. Ceramic spacers 50 are preferred over glass, porcelain, or other materials because ceramic can be fabricated of materials having higher melting temperatures, which may be necessary to preserve structural integrity in the high temperature environments generated by the catalytic reactions.

The exhaust gas paths between the inner end plates 32, 34 and the outer end plates 38, 40 are preferably enclosed by gas-impermeable, but thin metal foil ducts 52 and 54 welded to the respective metal end plates 32, 38, and 34, 40 to maintain the vacuum-tight seal of the insulating chamber 30 between inner housing 12 and outer housing 24. The ducts 52, 54 are also preferably folded or corrugated like bellows to increase the effective distance that heat would have to travel in conduction from the inner housing 12, through the ducts 52, 54, to the outer housing 24. A plurality of thin, reflective metal foil radiation shields 56 which could be separated by spacers 58, preferably made of ceramic, but not a significant outgassing material, can be placed in chamber 30 to inhibit radiative transfer between the inner housing 12 and outer housing 24.

The chamber 30 is evacuated to a high order vacuum, preferably in the range of $10^{-5}$ to $10^{-6}$ torr for a highly effective vacuum insulating effect. However, a vacuum insulation disabling system, such as the gas control system 60 illustrated in FIG. 2, can be included to selectively enable or disable the insulation effect of vacuum chamber 30. This gas control system 60, as described in our U.S. patent application Ser. No. 07/960,885, can comprise a hydrogen gas source, such as a metal hydride 62, and a hydrogen window or gate, such as palladium 64, enclosed in respective metal containers 66, 68, and connected via a conduit 70 to the vacuum chamber 30. When the metal hydride 62 is heated, for example by an electric heating element 72, it gives up hydrogen gas, which flows into chamber 30 and conducts heat across chamber 30, thereby effectively disabling or turning off the insulation effect of chamber 30. Then, when the metal hydride 62 is cooled, it recaptures the hydrogen gas and creates a low pressure gradient in the container 66 that pulls the hydrogen gas back from chamber 30, thereby re-enabling or turning on the insulation effect of chamber 30. The palladium gate 64 allows the hydrogen gas to pass through when it is heated, such as by the heating element 74, but it is impervious to the hydrogen gas when it is not heated. Therefore, the hydrogen gas, once introduced into chamber 30 by heating both the metal hydride 62 and palladium gate 64, can be retained in the chamber 30, even when the electric power is turned off for the heating element 72, by also turning off the electric power to heating element 74 and allowing the palladium gate 64 to cool. In fact, the palladium gate 64 would normally be allowed to cool first, before cooling the metal hydride 62, to be sure substantially all the hydrogen is trapped in chamber 30 for maximum insulation disablement by the gas control system 60. Then, when the insulation is to be turned back on again, only the palladium gate 64 has to be heated momentarily to allow the hydrogen gas to be pulled out of chamber 30 through the palladium gate 64 and back into the metal hydride 62. Of course, the respective heating and cooling of the metal hydride 62 and palladium gate 64 can be controlled and timed to only partially enable or disable the gas conductance of heat across chamber 30 to any desired extent and thereby to vary or control the rate of heat transfer anywhere between full on and full off.

Electric power for operating the gas control system 60 as described herein can be from battery power, as indicated at 88. However, it is also an appropriate application for use of thermoelectric or thermovoltaic energy source devices using heat generated by the catalytic converter. In fact, output of sufficient heat from the catalytic converter to start producing some threshold level of electricity in such thermoelectric or thermovoltaic device could start and sustain the heat conductance of the insulation chamber 30.

The heating elements 72, 74 can be turned on and off by any suitable electrical control system, such as respective relay switches 82, 84 controlled by a suitable electronic control unit 86, such as a microprocessor or other logic circuit, as would be well within the capabilities of persons skilled in designing and fabricating electric control circuits, once the principles of this invention are understood. For example, the control unit 86 could include a timing capability connected to the motor vehicle ignition switch 76 or other circuit that indicates when the engine E (FIG. 1) is started and then actuate the relay switches 82, 84 to turn off the insulation chamber 30 after an appropriate time interval that is set to allow the catalyst substrates 14, 16, 18 to reach the optimum catalyst operating temperatures. Then, the control unit 86 can be programmed to turn the insulation chamber 30 on again, when the engine E is turned off in order to retain the heat in the catalyst substrates 14, 16, 18 as long as possible during the time that the engine E is not operating, rather than allowing it to cool quickly to ambient temperature. When controlled in that manner, the catalysts substrates 14, 16, 18 may be maintained at temperatures above light-off temperature for extended periods of time until the engine E is started again, thus having the benefit of facilitating the catalytic reactions on the exhaust gases almost immediately to reduce harmful exhaust emissions, rather than suffering the delay required to reach light-off temperature again from ambient temperature.

Figure 3:
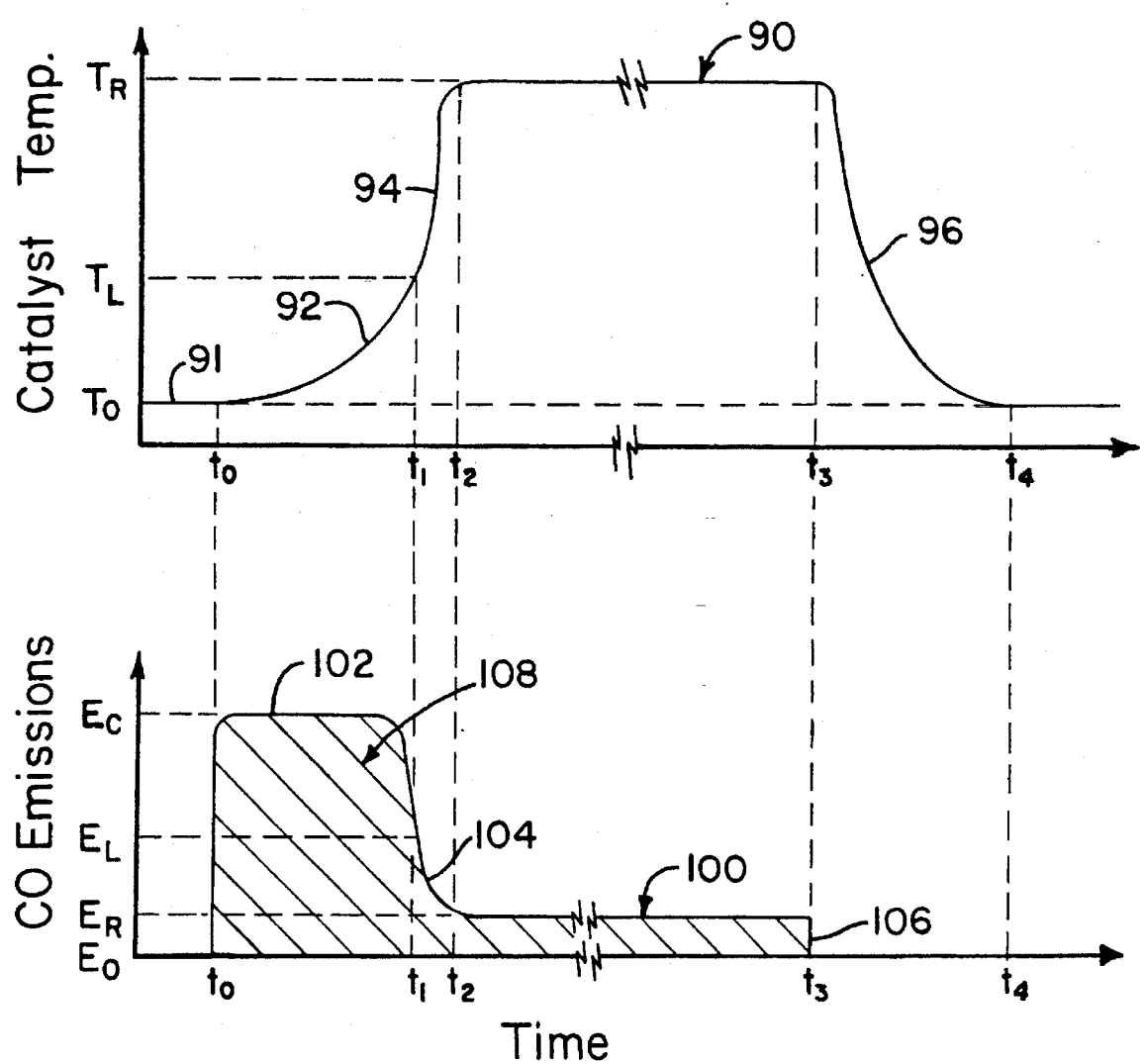
FIG. 3 is a graphical illustration of the relationships among time of operation, temperature, and emissions of conventional catalytic converter exhaust systems.
Figure 4:
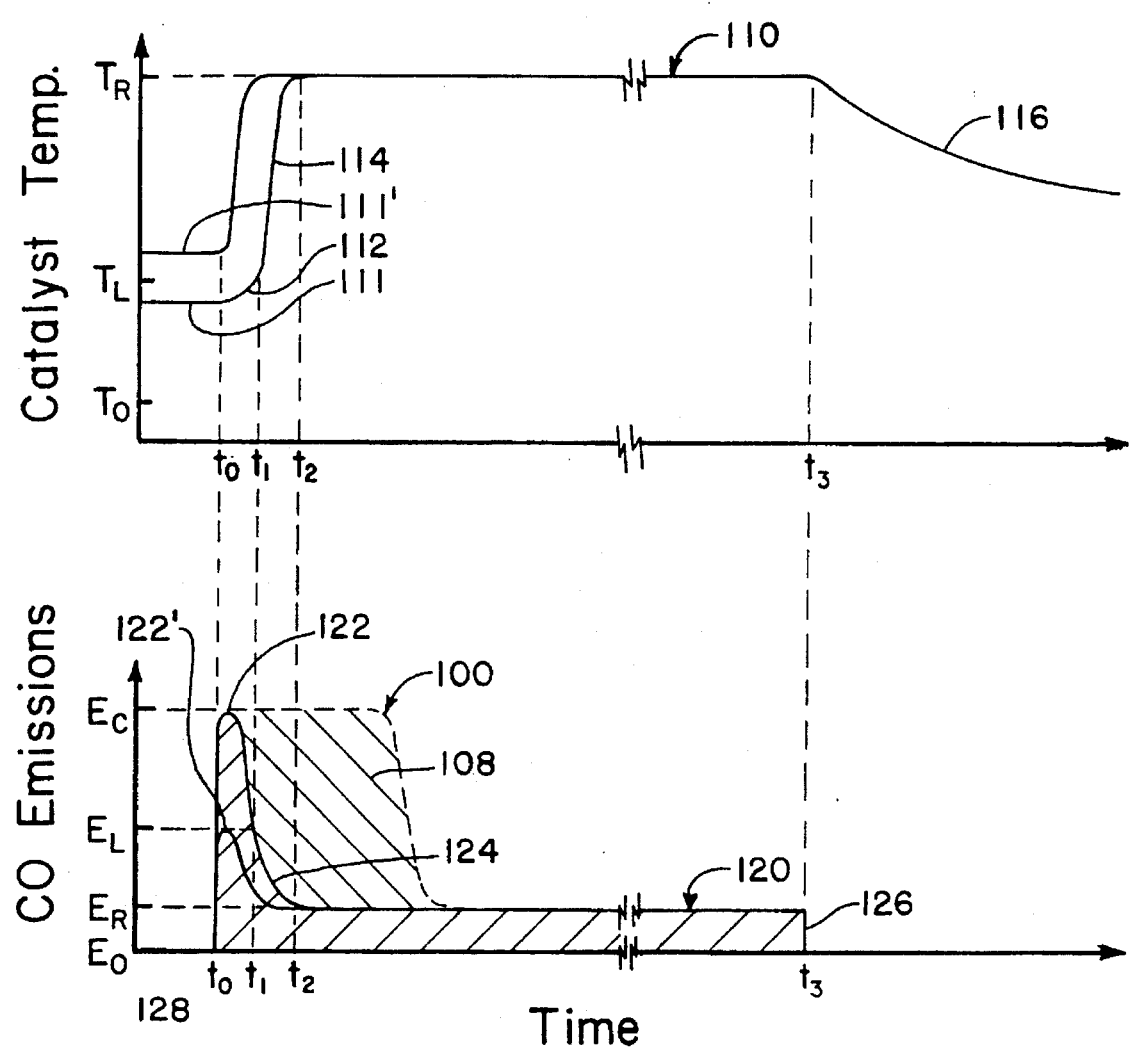
FIG. 4 is a graphical illustration of the relationships among time of operation, temperature, and emissions of catalytic converter exhaust systems constructed for heat management according to this invention as compared to emissions of conventional catalytic converter systems.

This benefit is illustrated by FIGS. 3 and 4. Referring first to FIG. 3, the curve 90 illustrates the relation between engine operation time and catalyst temperature in a conventional catalytic converter (not shown), while the curve 100 illustrates exhaust emissions from a conventional catalytic converter in relation to time of engine operation and to the time-temperature profile curve 90. For example, in conventional catalytic converter operation before the engine is started, the catalyst temperature, as indicated at 91, is essentially at ambient temperature $T_o$. Ambient temperature $T_o$, of course, can be over 100° F. in the summer or less than 0° F. in the winter, but in any event is far below the typical 600°–800° F. light-off temperature $T_L$ of state-of-the-art catalysts. When the engine is started at an initial time $t_o$, the exhaust temperature is initially relatively cold, and the exhaust gases are wet and rich with unburned fuel. Therefore, as illustrated at 102, the exhaust emissions $E_c$ of the cold engine and the cold catalytic converter are very high during an initial warming period 92. When light-off temperature $T_L$ (about 600°–800° F.) is finally reached at a time $t_2$ after an initial warm-up period 92 (typically about 60–180 seconds) driven by the heat in the exhaust gases from the engine, the exothermic heat from the catalytic reactions with the exhaust gases in the catalytic converter drive the temperature up at a much accelerated rate, as indicated at 94, until some equilibrium operating temperature $T_R$ is reached at a time $t_2$. Light-off temperature $T_L$, as indicated above, is defined as the temperature at which emissions $E_L$ have 50% of the hydrocarbons converted by the catalyst. During this same time interval from $t_1$ to $t_2$ (about 30–60 seconds), the catalytic reaction becomes much more effective, and the emissions decrease rapidly, as illustrated at 104, to an operating level $E_R$, which is substantially maintained as long as the engine is running. The specific operating temperature $T_R$ will, of course, depend on a number of factors, such as fuel content in the exhaust gases, engine load and exhaust volume or flow rate, effectiveness of the catalyst, and heat dissipating capabilities of the catalytic converter, but it is intended to be high enough (about 1,200° F.) to catalyze the emission-reducing reactions efficiently, but not so high as to damage the catalyst, its substrate, or adjacent components or structures. When the engine is turned off, such as at a time $t_3$, the emissions, of course, end abruptly as indicated at 106, and the catalytic converter, including the catalyst, cools quite rapidly as indicated at 96, to ambient temperature $T_0$ again at some time $t_4$, which, depends on many factors, such as environmental weather or other conditions, what the ambient temperature $T_o$ is, and the structure and placement of the catalytic converter in the vehicle. Generally, however, it could be expected that a typical conventional catalytic converter will cool down below light-off temperature $T_L$ within about 20 to 40 minutes and to near-ambient temperature $T_0$ in about 4 to 6 hours. The shaded area 108 under curve 100 represents overall emissions during the engine operation.

Referring now to FIG. 4, the time-temperature profile 110 and corresponding time-emissions profile 120 of a catalytic converter 10 (FIG. 2) constructed according to the present invention illustrates the modified temperature management and resulting improved emissions reduction of this invention. The effectiveness of the insulating performance of chamber 30 and associated thermal storage elements according to this invention is sufficient to hold heat in the catalytic converter substrates 14, 16, 18 (FIG. 2) for up to 40 hours or more with less than five (5) pounds of thermal storage or heat sink material, depending on ambient temperature and other ambient weather conditions. Therefore, unless the vehicle has not been driven for a very prolonged period of time, the catalyst temperature before start-up at $t_0$ will still be above ambient temperature $T_0$, and most likely very near the light-off temperature $T_L$, as illustrated at 111, if the engine E has been operated within the preceding twelve hours, which is typical of the use of most motor vehicles used to commute between home and work. If the vehicle has been driven even more recently, such as within the past ten to twenty hours, the insulation chamber 30 and associated thermal storage elements will have maintained the catalyst substrates 14, 16, 18 above light-off temperature $T_L$, as illustrated at 111'.

When the engine E (FIG. 1) is started at a time $t_0$, the already warm catalyst at 111 or 111' (FIG. 4) is already effective at catalyzing some exothermic reaction with exhaust gases. Therefore, if the catalyst is not already at or above light-off temperature $T_L$, it gets there within a very short time period $t_0$ to $T_1$ on the order of about 60 seconds, as illustrated at 112. This warm-up period $t_0$ to $t_1$ is shortened not only by having the catalyst already warm at start-up time $t_0$, but by the effectiveness of the insulation chamber 30 confining exothermic reaction and exhaust heat in the catalyst substrates 14, 16, 18 during warmup. Therefore, the warm-up period of high emissions $E_c$, illustrated at 122, during the period of $t_o$ to $t_1$ is also very short, certainly much shorter than the period of high emissions $E_c$ for conventional catalytic converters, as illustrated by the curve 100, which is superimposed from FIG. 3 onto FIG. 4 in broken lines. The warm-up emissions are even less, as illustrated at 122' when the engine is started with the catalyst temperature above light-off temperature $T_L$. Of course, once light-off temperature $T_L$ is reached at $t_1$, the exothermic reaction increases the temperature of the catalyst very rapidly, as shown at 114, to an optimum operating temperature $T_R$. At the same time emissions decrease to a low operating level $E_R$, as illustrated at 124. At the optimum operating temperature $T_R$, the gas control 60 (FIG. 2) can be actuated to turn the insulation chamber 30 off in order to allow dissipation of excess heat created by the exothermic catalytic reaction with exhaust gases into the environment surrounding the outer housing 24. When the engine is turned off, such as at time $t_3$, the emissions, of course, stop, as shown at 126. However, as soon as the engine E (FIG. 1) is turned off at time $t_3$ (FIG. 4), the gas control 60 (FIG. 2) is actuated to turn the insulation chamber 30 back on to prevent rapid cooldown of the catalyst to ambient temperature $T_0$. The much slower cool down with the insulation chamber 30 turned on is illustrated at 116 in FIG. 4, and, as discussed above, the catalyst can be kept above ambient temperature $T_0$ for up to 40 hours or more.

The overall emissions during operation of a motor vehicle equipped with a heat-managed catalytic converter system 10 according to this invention is illustrated by the shaded area 128 under curve 120 in FIG. 4. The relative reduction of start-up emissions achieved by the heat-managed catalytic converter 10 of this invention over conventional catalytic converters can be seen by comparing the shaded area 128 under curve 120, representing emissions of the catalytic converter 10 of this invention, with the shaded area 108 under curve 100, representing emissions of conventional catalytic converters.

Referring again to FIG. 2, while the control unit 86 can be set up to turn the insulation chamber 30 off at some pre-set time after engine start-up, which is preferably a sufficient time for the catalyst to reach light-off temperature $T_L$, as described above, other inputs and controls can also be used, as would be within the capabilities of persons skilled in this art, once the principles of this invention are known. For Example, an input from a temperature probe 78 in contact with the inner housing 12 could be used to actuate the gas control 60, such as to shut off the insulation chamber 30, when the temperature of the inner housing 12 reaches a certain desired operating temperature. Of course, such a temperature probe 78 would have to be well insulated from the environment and from the outer housing 24 to avoid heat conduction therethrough when the insulation chamber 30 is turned on. It would also have to be sealed against leakage where it emerges through the outer housing 24, such as with ceramic sealing connectors similar to those described in our U.S. patent application Ser. No. 07/960,885.

An alternative or additional temperature probe 79 in the downstream exhaust outlet 130 to measure the temperature of the exhaust gases emerging from the catalytic converter 10 could also be indicative of, even if not exactly the same as, the temperature level of the catalysts, thus useable for actuating the gas control 60. Such an alternative temperature probe 79 in the outlet 130 would not have to be insulated to avoid heat transfer or sealed to hold a vacuum, as would be required for the probe 76 extending through the insulation chamber 30.

Other inputs, such as a temperature sensor 80 positioned adjacent the outer housing 24, could be used to turn on or off the insulation chamber 30. For example, if other components or structures (not shown) near the catalytic converter 10 can withstand temperatures only so high, the temperature sensor 80 could cause the control unit 86 to actuate gas control 60 to turn on the insulation chamber 30 if the temperature of heat 81 radiating from the outer housing 24 goes above a preset level.

On the other hand, in other applications, it might be more important to "dump" heat from the inner housing 12 and catalyst substrates 14, 16, 18 faster than the turned off insulation chamber 30 can handle. Therefore, metal-to-metal contacts to function as thermal shunts between the inner housing 12 and outer housing 24 can be provided. For example, as shown in FIG. 2, one or more bimetallic dimples or actuators 132, similar to those described in our U.S. patent application Ser. No. 07/960,885, can be provided in the inner housing side wall 36 and designed to actuate from a normally concave configuration to an alternate convex configuration, as indicated by broken lines 132', when the inner wall 36 reaches a predetermined maximum temperature. Thermal shunt posts 134, preferably made of a good heat conducting metal, extends from the outer wall 42 of outer housing 24 into close enough proximity to the respective bimetallic actuators 132 such that when the bimetallic actuators snap to their convex configurations 132', they will make metal-to-metal contact with the posts 134. When such metal-to-metal contact is made, the posts 134 conduct heat very rapidly from the inner housing 12 to the outer housing 24, where it can dissipate to the surrounding environment.

It may also be desirable in some circumstances or applications to enhance conduction of heat from the catalyst substrates, such as the fore and aft substrates 14, 18, to the inner housing wall 36 and into the insulation chamber 30, such as where the substrates 14, 18 are made of ceramic materials that are poor conductors of heat. Such enhanced heat conduction can be provided by one or more elongated spikes 136, having one end extending into the substrates 14, 18 and the other end extending through inner housing wall 36 and into the insulation chamber 30. If these spikes are not long enough to contact the outer wall 42 so that there is no metal-to-metal heat conduction through them to the outer housing 24, they will still conduct heat to the hydrogen gas in the insulation chamber 30 when the insulation chamber 30 is turned off by gas control 60, as described above.

Figure 6:
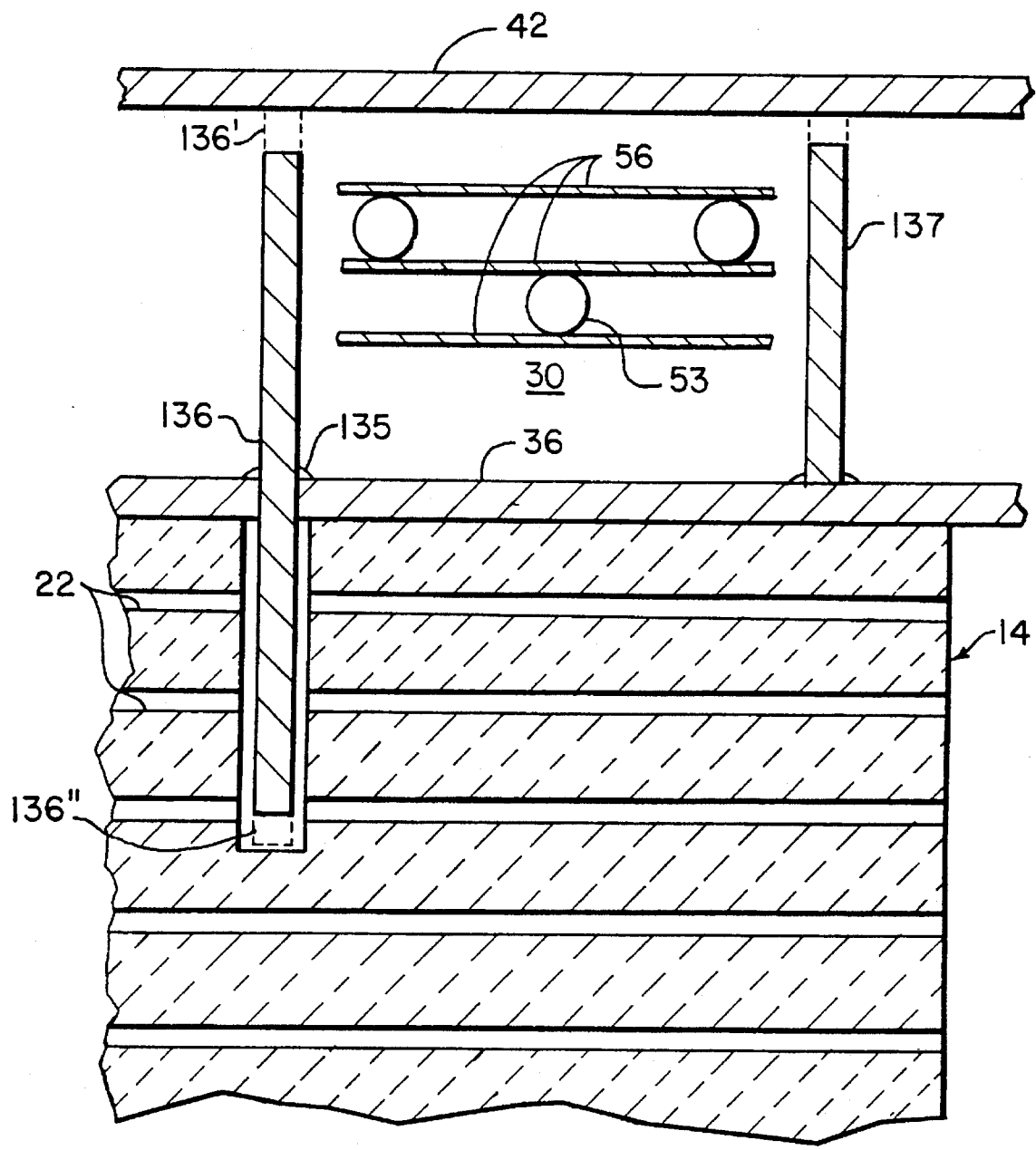
FIG. 6 is an enlarged cross-sectional view of the thermal short circuit spikes used for varying thermal conductivity of the catalytic converter embodiments of FIG. 2 or FIG. 5.

Alternatively, the spikes 136 can be designed and positioned to not contact outer housing 24 at lower temperatures, but to elongate enough by thermal expansion to contact the outer sidewall 42 of housing 24, as indicated at 136' in FIG. 6, at higher temperatures. Once contact is made, as indicated at 136', the spikes 136 become a thermal shunt or short circuit to conduct heat directly from the inner housing 12 to the outer wall 42 of outer housing 24. To function in this manner, the spike 136 is anchored at its mid-section by welding 135 to the cylindrical wall 36. Therefore, as it heats up, the spikes 136 expand axially at both ends, as indicated by the phantom lines 136' and 136" in FIG. 6. The heat required to cause sufficient expansion of spike 136 to contact outer sidewall 42 as shown at 136' can be designed into spike 136 taking into consideration such parameters as the length of spike 136 extending outwardly from the welded attachment 135 to cylindrical wall 36, the type of metal or other material of which spikes 136 are fabricated and its coefficient of thermal expansion, the gaps between the ends of spikes 136 and the outer sidewall 42, and the like. The catalytic converter 10 can be designed and fabricated with a plurality of these spikes 136 having different lengths or made of different materials with different coefficients of thermal expansion, so that they do not all make contact with the outer sidewall 42 at the same time or at the same temperature in order to vary the number of thermal short circuits, thus varying the overall thermal conductivity across the chamber 30. The spike 137 shown in FIG. 6 is an alternate that extends only radially outward from the cylindrical wall 36 and not inward, so it picks up heat only from the cylindrical wall 36, which can be another variation of design for establishing a thermal short circuit.

It may also be preferable, but not necessary, to provide additional radiation and convection heat control by providing a heat absorber or retarder material 138, as shown in FIG. 2, in the exhaust gas path to inhibit direct axial radiation of heat from the substrates 14, 16, 18 out of the inner housing 12, as well as to break up convection flows of hot exhaust gases in that area. While the heat absorber or retarder material 138 is shown as a solid maze structure in FIG. 2, it could be a bulky material, such as ceramic wool fibers that are opaque to infrared radiation, thereby forcing multiple reradiations between fibers, thus retarding heat escape by axial radiation. Ceramic wool fibers or other materials also act to reduce the size of the convection cell, thereby retarding heat escape by convection. While the retarder material 138 is shown only at the downstream end of the inner housing 12, a similar retarder could, of course, also be placed in the space immediately upstream of the first substrate 14.

Figure 5:
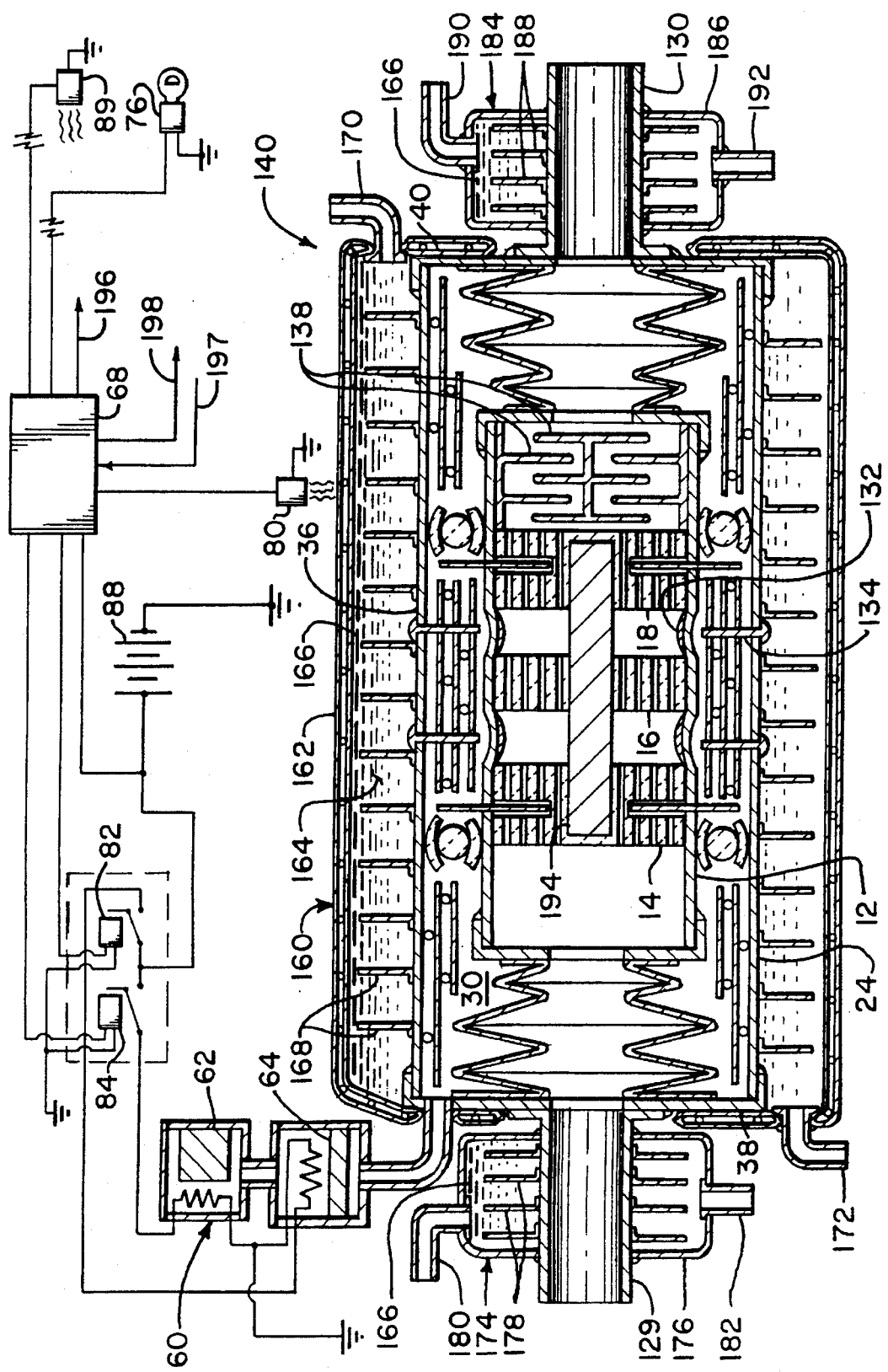
FIG. 5 is a cross-sectional view of an alternate embodiment catalytic converter heat management system according to this invention.

For more extensive exhaust heat and emissions management according to this invention, an alternative embodiment catalytic converter 140 with heat storage and heat exchanger features is illustrated in FIG. 5. However, before proceeding with a detailed description of the catalytic converter 140, reference is first made again to FIG. 1. In this embodiment, heat generated by the exothermic catalytic reactions with exhaust gases is put to beneficial uses, stored, or dissipated, as appropriate for a variety of reasons. For example, the catalytic converter 140 produces heat and heats up much more quickly than a cold engine E after start-up, and a cold engine E not only does not run as efficiently as a warm engine, but it also produces more harmful exhaust emissions as well as more wear on engine parts. Further, the passenger compartments of most vehicles are heated with hot engine coolant, so there is no heat for passenger comfort or windshield defrosting until the engine E heats up not only itself, but also the coolant in the water jacket of the engine E.

Therefore, according to this invention, heat generated by the catalytic converter 140, instead of being wasted by dissipation to the atmosphere, can be gathered in a manifold 142 and directed to the water jacket of the engine E, as indicated schematically by broken lines 144, to help warm up the engine E more quickly, which in turn can get warm coolant to the passenger compartment heater H more quickly via the conventional heater hoses indicated schematically by the broken lines 146. Alternatively or additionally, the heat generated by the catalytic converter 140 can be carded directly to the passenger compartment, as indicated schematically by broken lines 148 to heat seats S or other components such as windshields, steering wheels, and space heaters. Since the temperature in and immediately around an operating catalytic converter 140 are apt to be too high for standard engine coolant/antifreeze solutions, it is preferred to use a heat transfer and storage fluid 166 (FIG. 5) in the heat exchanger chamber 164 that has a higher boiling point and is more stable than engine coolant/antifreeze solutions at such higher temperatures. Consequently, another heat exchanger interface 153 (FIG. 1) is provided to transfer more moderate heat and temperature levels to the engine coolant/antifreeze solution that is used in the vehicle engine E.

When additional heat is not needed, such as during normal extended operation of the motor vehicle with the catalytic converter 140, engine E via a connection 144, and other components already up to their normal operating temperatures, the heat generated in the catalytic converter 140 can be directed to a heat storage sink 150, to a heat dissipator 152, or to the engine E via connection 144 from where it can be dissipated along with heat from the engine E into the atmosphere by the conventional vehicle radiator R. The actual plumbing, valves, controls, and the like for the various heat uses and components described above are not shown in detail, since they are well within the capabilities of persons skilled in this art, once the principles of this invention are understood. Suffice it to say that, if liquid engine coolant or other liquid medium is used to transfer heat, such a circulating circuit would comprise one conduit to send the liquid, another conduit to return the liquid, a pump, various valves, and valve controls that could be either manual or automatically operated by electricity, vacuum, or air pressure. Also, the heat storage sink 150 can be used to store heat for later use in warming a start-up engine or a cold passenger compartment, or the stored heat might also be used to help maintain an elevated temperature in the catalytic converter itself over more extended periods of time. It can be, for example, a heat storage device such as that described in the article entitled, "Latent Heat Storage," published in the February 1992 issue of Automotive Engineering, Vol. 100, No. 2, pp. 58–61. Heat pipes, while not specifically shown in the drawings, could also be used in place of a heat transfer fluid to transfer heat to and from the catalytic converter.

Referring now to FIG. 5, the catalytic converter 140 according to this invention has the same basic components as the catalytic converter 10 described above, including, but not limited to, three catalyst substrates 14, 16, 18 contained in an inner housing catalyst 12, an outer housing 24 enclosing a insulation chamber 30, gas control system 60, metal-to-metal thermal shunt posts 134 and associated bimetallic actuators 132, and axial radiation retarder material 138.

However, the catalytic converter 140 also has at least one main heat exchanger 160 surrounding the outer housing 24 for picking up heat from the outer wall 36 and carrying it to the manifold 142 (FIG. 1) or other components or uses described above. The main heat exchanger 160 comprises an outer jacket 162 extending radially outward from the outer end walls 38 and 40 of outer housing 24 and enclosing a main heat exchanger chamber 164, which surrounds the outer wall 36. The chamber 164 is built and sealed to contain a heat exchanger fluid 166, which can be either a liquid or a gas, preferably a fluid that is stable, and, if a liquid, would not reach its boiling point, at the high temperatures that would normally be encountered in a catalytic converter, as described above. Such a heat exchanger fluid might be, for example, a polyether or a silicone.

A plurality of fins 168 project radially outward from the outer wall 36 into the heat exchanger chamber 164 to increase heat exchange surface area. Consequently, when the insulation chamber 30 is turned off, heat transferred from the catalyst substrates 14, 16, 18 and inner housing 12 across chamber 30 to outer housing 24 is efficiently picked up by the fluid 166 from the fins 166. The fluid 168 can be flowed through the heat exchanger chamber 164, e.g., into inlet 170 and out of the outlet 172, to carry the heat away from the catalytic converter 140. Suitable hoses or other plumbing (not shown) can carry the heated fluid 166 to other components, such as the manifold 142, heat sink 150, heat dissipator 152, heat exchanger 153, and the like, as shown in FIG. 1 and explained above. Of course, the reverse is also possible, i.e., the fluid 166 can carry heat from the heat sink 150 back into the catalytic converter 140, such as to pre-heat the catalyst substrates 14, 16, 18 prior to starting the engine E.

The jacket 162 of the main heat exchanger 160, as shown in FIG. 5, is preferably fabricated with a very effective insulating material, such as the compact vacuum insulation (CVI) that is the subject matter of our U.S. Pat. No. 5,175,975, which is incorporated herein by reference. Consequently, when the insulation chamber 30 is turned on, e.g., when the engine E is turned off, not only are the hot inner housing 12 and hot catalyst substrates 14, 16, 18 isolated by the highly effective insulation chamber 30, but the outer housing 24 is also surrounded by the hot fluid 166 in the heat exchanger chamber 164. The CVI jacket 162 is very effective at maintaining the heat in the surrounding fluid 166, which further inhibits transfer of heat from the catalyst substrates 14, 16, 18 by keeping heat gradient or differential across the insulation chamber 30 very low.

Several optional features of the catalytic converter 140 include secondary heat exchangers 174, 184 to recover heat from the exhaust gas inlet 129 and outlet 130. As shown in FIG. 5, secondary heat exchanger 174 on inlet 129 includes a jacket 176 enclosing a chamber containing fins 178 extending radially outward from the inlet 129. A heat exchange fluid, such as the same fluid 166 used in the main heat exchanger 160, can be flowed through the chamber from fluid inlet 180 to fluid outlet 182 to carry heat from the fins 178 to other components for use, storage, or dissipation, as described above. Likewise, the secondary heat exchanger 184 on exhaust outlet 130 has a jacket 186 containing the heat transfer fluid medium 166, which circulates in through inlet 190 and out outlet 192 to carry heat from fins 188 to other components for use, storage, or dissipation, as described above. The jackets 176, 186 on secondary heat exchangers 174, 184 are not shown as comprising CVI, since these secondary heat exchangers do not perform the primary function of retaining heat in the catalyst substrates 14, 16, 18, although they could be made of CVI to assist in that function or otherwise to minimize heat loss to the surrounding atmosphere, if desired.

Another optional feature of the catalytic converter 140 illustrated in FIG. 5 is a solid heat sink core 194 extending through the centers of catalyst substrates 14, 16, 18. This solid heat sink core 194 serves two purposes. First, it causes the catalytic reaction of exhaust gases to occur in the outer portions of the catalyst substrates 14, 16, 18, thereby minimizing the distance heat has to flow through the ceramic substrates 14, 16, 18 to the inner housing 12, when heat is being transferred across the insulation chamber 30. Second, the heat sink core 194 is preferably a material such as aluminum silicon or magnesium zinc that has a large heat sink capacity, so it receives and retains a large amount of heat during catalyst operation. Then, when the engine E is turned off and the insulation chamber 30 is turned on, the heat contained in the lieat sink core 194 helps to maintain the temperature of the catalyst substrates 14, 16, 18 over an even longer period of time, thereby enhancing the likelihood that they will still be above or near light-off temperature, or at least above ambient temperature the next time the engine E is started.

As in the catalytic converter embodiment 10 (FIG. 2) described above, the controller 68 in FIG. 5 can take input signals from a variety of devices or sensors, such as ignition switch 76, temperature sensors 80, 89, and the like, to initiate actuation of the gas control 60 for turning the insulation chamber 30 on and off. For example, the temperature sensor 80 positioned adjacent jacket 162 can sense when the environment around the catalytic converter 140 is getting too hot and cause the controller to either turn on the insulation chamber 30 or start circulation of fluid 166 via a connection 196 to a pump control (not shown) or other suitable vehicle or system control components. A more remote temperature sensor 89 positioned, for example, in the engine E water jacket or in the vehicle passenger compartment can input signals to the controller 68 to actuate or aleactuate the insulation chamber 30, circulation of fluid 166, and the like. Various other optional signal inputs, represented by lead 197, as well as optional signal outputs, such as to valves and other components, represented by lead 198, may become obvious to persons skilled in this art once they have an understanding of the principles and principal features of this invention.

To further increase the thermal capacitance of the catalytic converter, particularly for keeping sufficient heat stored for long periods of time to have available for heating the substrates 14, 16, 18 to light-off temperature before starting the engine E, a quantity of phase change material (PCM), such as metals, metal salt hydrates, or a hydride of trimethylol ethane (TME) or other polyhydric alcohols, described in U.S. Pat. Nos. 4,572,864 and 4,702,853, both of which are incorporated herein by reference, can be contained around or in thermal flow relation to the substrates 14, 16, 18. For example, in the embodiment 140 of FIG. 5, rather than flowing a heat transfer fluid 166 through the main heat exchanger chamber 164, as described above, the chamber 164 could be filled instead with a PCM, with or without the inlet and outlet fittings 170, 172. As heat is created by the catalytic reaction inside the inner housing 12, the thermal conductance of the insulation chamber 30 is actuated (insulative effect disabled), as described above, to transfer the heat into the solid PCM 166 where it serves as heat of fusion to melt the PCM and is stored in that manner in the liquid PCM. Thereafter, if the PCM is supercoolable or triggerable, as the hydrates or hydrides referenced above, when the engine E is turned off and the substrates 14, 16, 18 consequently cool off, the heat of fusion in the liquid PCM is retained even as the PCM super cools below its melting temperature, as described in the U.S. Pat. No. 4,860,729 which is incorporated herein by reference. Later, when the operator decides to start the engine E, a signal from the ignition switch 76 can actuate a phase change trigger, such as that described in U.S. Pat. No. 4,860,729, which is also incorporated herein by reference. Such a phase change trigger, as indicated at 154 in FIG. 1, could be connected to one of the fittings 170, 172 shown in FIG. 5. When actuated, the phase change trigger initiates nucleation of crystallization of the PCM thereby causing it to give up its heat of fusion. With the conductance of the insulation chamber 30 also actuated (insulative effect disabled), the heat of fusion from the PCM is conducted back into the inner housing 12 to the substrates 14, 16, 18 to help them reach light-off temperature.

There are, of course, numerous other ways to use a PCM for these purposes. For example, the heat sink 150 or another similar device could contain a PCM. The heat could also be transferred to and from an external PCM container with a liquid heat exchanger fluid 166. Still further, another chamber (not shown) could be positioned radially outward from chamber 164 to enable use of both a PCM and the thermal transfer fluid 166 surrounding the inner housing 12.

Figure 7:
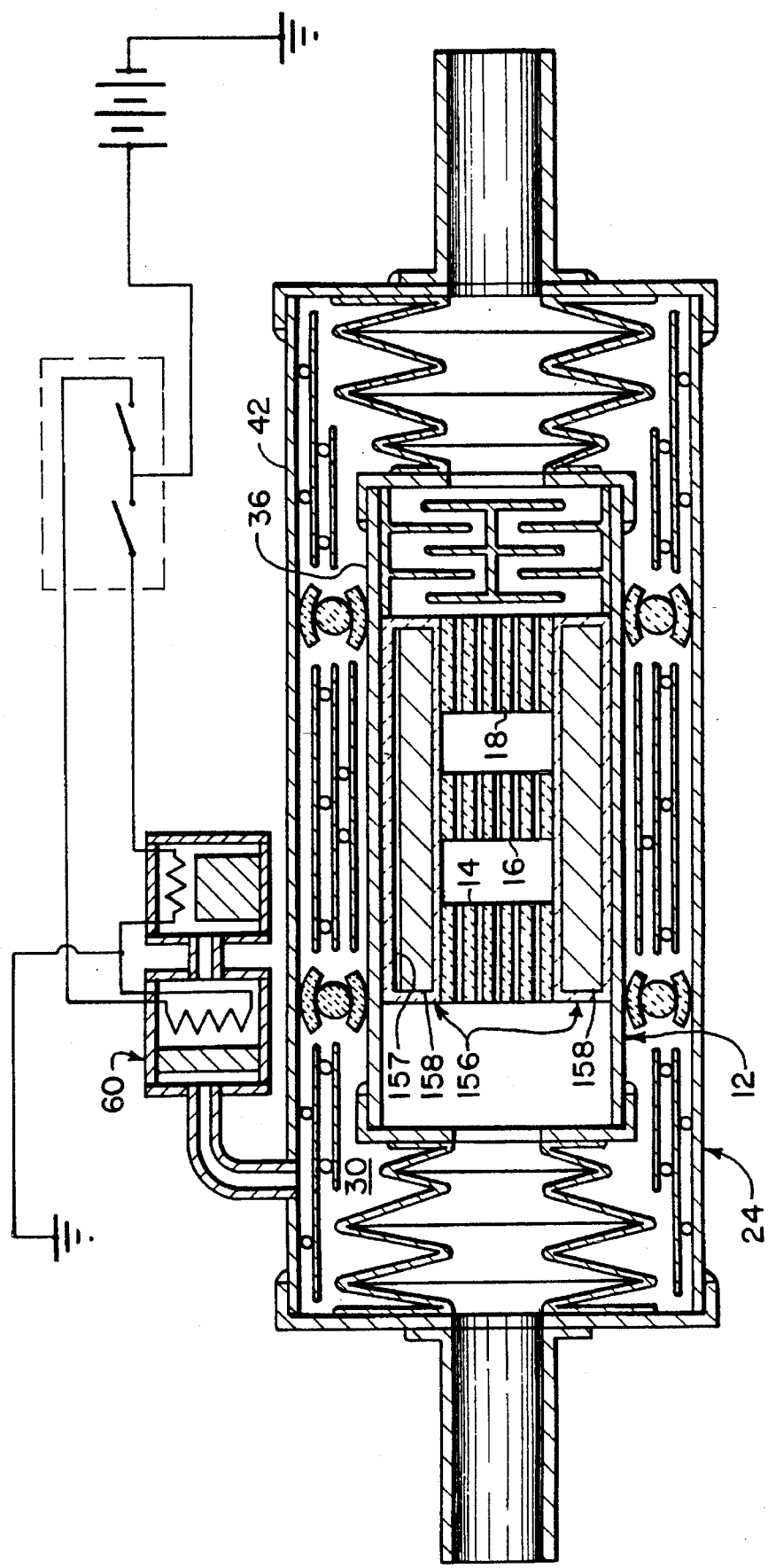
FIG. 7 is a cross-sectional view of an alternate embodiment in which a phase change material is positioned in the inner housing surrounding the catalyst substrate.

In another embodiment illustrated in FIG. 7, a ceramic container 156 with an annular chamber 157 is positioned inside the inner housing 12 and in surrounding relation to the catalyst substrates 14, 16, 18. A phase change material 158, such as aluminum or aluminum alloy almost, but not quite fills the annular chamber 157. As the catalyst substrate heats up during operation of the engine E, it also heats up the container 156 and phase change material 158. However, since ceramic is a poor heat conductor, this container and phase change material 158 does not take up heat fast enough to increase the time required to heat the substrates 14, 16, 18 to light-off temperature. Over time, however, during operation of the engine E, the material 158 in chamber 157 will get hot enough to melt and heat up substantially to the optimum operating temperature of the catalytic converter, as controlled according to the features of this invention discussed above. The slight underfill mentioned above leaves sufficient space in the chamber 157 to accommodate expansion of the material 158 as it heats up. Then, when the engine E is turned off, the phase change material 158 will help to hold heat on the substrates 14, 16, 18. Initial cooling is in a sensible manner, as discussed above for the core heat sink 194 in FIG. 5. However, when the temperature cools down to the freezing point of the material 158, the temperature will stay constant for an extended period of time as the material 158 gives up its heat of fusion. Consequently, where the composition of the material 158 has a freezing/melting temperature above the light-off temperature of the catalyst, the material 158 helps to maintain the substrates 14, 16, 18 above light-off temperature for extended periods of time.

While the description and exemplary application of this invention has been directed primarily to vehicles with internal combustion engines, it is not restricted to that application. Other applications can be for example, in the chemical and petrochemical industries for controlling the temperature of catalytic process reactors.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed axe defined as follows:

What is claim is:

1. Exhaust heat management apparatus, comprising:
   catalytic converter means comprising a catalyst and a substrate providing surface and support structure for the catalyst for catalyzing oxidation or reduction reactions with pollutants in exhaust gases;
   catalyst housing means for containing said catalytic converter means and for channeling exhaust gases to the catalytic converter means; and
   variable conductance insulation means surrounding said catalyst housing means for selectively insulating said housing means to inhibit transfer of heat radially from said housing means in response to a first signal or for enabling transfer of heat in response to a second signal.

2. The apparatus of claim 1, wherein said catalyst housing means includes an inner metal sidewall and said variable conductance insulation includes an outer metal enclosure surrounding said inner metal sidewall and spaced radially outward from said inner metal sidewall to enclose a main insulation chamber between said inner metal sidewall and said metal enclosure.

3. The apparatus of claim 2, wherein said main insulation chamber is evacuated to a very high grade vacuum, and wherein said variable conductance insulation means includes insulation disabling means connected to said main insulation chamber for selectively disabling heat transfer inhibiting effect of said main insulation chamber in response to said second signal or enabling heat transfer inhibiting effect of said main insulation chamber in response to said first signal.

4. The apparatus of claim 3, wherein said insulation disabling means comprises gas source means connected to said main insulation chamber for releasing gas into said main insulation chamber in response to said second signal or for recovering said gas from said main insulation chamber in response to said first signal.

5. The apparatus of claim 4, wherein said gas source means includes a metal hydride that releases hydrogen gas when heated and recovers hydrogen gas when cooled.

6. The apparatus of claim 5, wherein said gas source means includes gate means positioned between said metal hydride and said main insulation chamber for selectively passing or blocking flow of hydrogen gas.

7. The apparatus of claim 6, wherein said gate means comprises palladium, which allows hydrogen to flow therethrough when heated and blocks the flow of hydrogen therethrough when cooled.

8. The apparatus of claim 1, wherein said variable conductance insulation means is set to inhibit transfer of heat from said housing means when said exhaust gases start flowing through said catalytic converter means, and wherein said second signal actuates said variable conductance insulation means to enable transfer of heat from said housing means after said exhaust gases and said reactions raise the temperature of said catalytic converter means above light-off temperature.

9. The apparatus of claim 8, wherein said first signal actuates said variable conductance insulation means to inhibit transfer of heat from said housing means when said exhaust gases stop flowing through said catalytic converter means.

10. The apparatus of claim 9, including timer means for initiating said second signal.

11. The apparatus of claim 9, including temperature sensing means for generating said second signal.

12. The apparatus of claim 3, including heat actuateable thermal shunt means positioned between said inner housing and said outer metal enclosure for making metal-to-metal contact between said inner housing and said outer metal enclosure when the inner housing reaches a predetermined maximum temperature.

13. The apparatus of claim 12, wherein said thermal shunt means includes a bimetallic dement that switches from a concave to a convex configuration when the temperature of the bimetallic element reaches said predetermined temperature.

14. The apparatus of claim 12, wherein said thermal shunt means includes a thermally expandable spike anchored in said inner housing and extending radially outward to a position close enough to said outer metal enclosure to be thermally expandable into contact with said outer metal enclosure.

15. The apparatus of claim 3, wherein said variable conductance insulation means includes a plurality of ceramic spacers positioned between said inner sidewall and said outer metal enclosure, said spacers being shaped to form only point or near point contacts with said inner sidewall and said outer metal enclosure.

16. The apparatus of claim 15, wherein said spacers include a spacer element with a rounded outer surface and a liner element with a curved outer surface positioned between said spacer element and each of said inner sidewall and said outer metal enclosure.

17. The apparatus of claim 15, including at least one radiation shield in said main insulation chamber between said inner sidewall and said outer metal enclosure.

18. The apparatus of claim 3, including a thermal conduction spike extending through said inner sidewall into said catalytic converter means and into said main insulation chamber.

19. The apparatus of claim 18, wherein said spike is anchored to said inner sidewall and is thermally expandable and contractible into and out of contact with said outer metal enclosure as a function of temperature.

20. The apparatus of claim 3, including exhaust gas inlet conduit means extending between and separating said inner housing means and said outer metal enclosure for conducting exhaust gases into said inner housing means, said inlet conduit means including a corrugated tube fabricated of thin metal foil welded at one end to said outer metal enclosure and at the other end to said inner housing.

21. The apparatus of claim 3, including exhaust gas outlet conduit means extending between and separating said inner housing means and said outer metal enclosure for conducting exhaust gases out of said inner housing means, said outlet conduit means including a corrugated tube fabricated of thin metal foil welded at one end to said inner housing and said outer metal enclosure.

22. The apparatus of claim 21, including radiation retarder means positioned between said catalytic converter means and said outlet conduit means for interrupting radiation of heat emanating from said catalytic converter means toward said outlet conduit means.

23. The apparatus of claim 21, including convection retarder means positioned between said catalytic converter means and said outlet conduit means for interrupting convection of heat from said catalytic converter means toward said outlet conduit means.

24. The apparatus of claim 23, wherein said convection retarder means includes ceramic wool fibers.

25. The apparatus of claim 3, including heat exchanger means surrounding said outer metal enclosure for conducting heat away from said outer metal enclosure or to said outer metal enclosure.

26. The apparatus of claim 25, wherein said heat exchanger means includes an outer jacket positioned a radially spaced distance outward from said outer metal enclosure and enclosing a main heat exchanger surrounding said outer metal enclosure for containing a fluid heat exchanger medium.

27. The apparatus of claim 26, including a fluid inlet and fluid outlet for conducting said fluid heat exchanger medium into and out of said main heat exchanger chamber.

28. The apparatus of claim 27, wherein said outer jacket comprises compact vacuum insulation, including two hard, but bendable sheets of metal foil positioned in closely spaced relation to each other and sealed around their edges to each other by metal-to-metal welds to form a vacuum chamber therebetween, said vacuum chamber being evacuated to a pressure at least as low as $10^{-5}$ torr and a plurality of low heat conducting spacers between said sheets to maintain said spacing.

29. The apparatus of claim 27, including a heat sink thermal storage device connected in fluid flow relation to said main heat exchanger chamber.

30. The apparatus of claim 27, including heat dissipating means connected in fluid flow relation to said main heat exchanger chamber for dissipating heat conducted from said outer metal enclosure to said fluid medium.

31. The apparatus of claim 27, including fluid conduit means connecting said main heat exchanger chamber to a engine coolant heat exchanger for transferring heat to a water jacket in an internal combustion engine that produces the exhaust gases.

32. The apparatus of claim 3, including heat storage means surrounding said outer metal enclosure for storing heat generated in said inner housing means.

33. The apparatus of claim 32, wherein said heat storage means comprises a phase change material.

34. The apparatus of claim 32, including selectively actuateable trigger means for selectively initiating nucleation of the phase change material.

35. The apparatus of claim 1, including heat storage means in said catalyst housing means and in contact with said substrate for storing heat generated in said catalyst housing means.

36. The apparatus of claim 35, wherein said heat storage means comprises a phase change material.

37. The apparatus of claim 20, including a secondary heat exchanger connected to said exhaust gas inlet conduit means for taking heat from the exhaust gas before the exhaust gas reaches said substrate.

38. The apparatus of claim 21, including a secondary heat exchanger connected to said exhaust gas outlet conduit means for taking heat from the exhaust gas after the exhaust gas has gone through said substrate.

39. A method of managing heat in a catalytic converter comprising the steps of:

surrounding the catalytic converter with variable thermal insulation that can be varied between "on" to inhibit heat transfer and turned "off" to enable heat transfer;

turning on the variable thermal insulation when no exhaust gases are being reacted in the catalytic converter to retain heat in the catalytic converter;

leaving the variable thermal insulation turned on when the temperature of the catalytic converter and is less than the light-off temperature of the catalytic converter;

turning off the variable thermal insulation when the temperature of the catalytic converter is above light-off temperature.

40. The method of claim 39, including the step of controlling the variable thermal insulation between full on and full off to maintain said catalytic converter at a desired temperature.

41. The method of claim 40, including the step of recovering heat generated by the catalytic converter when the variable thermal insulation is turned off in a fluid medium and transferring the heat to another component.

42. The method of claim 41, including the step of transferring the heat in the fluid medium to the engine that produces the exhaust gases.

43. The method of claim 41, including the step of transferring the heat in the fluid medium to a heat storage device.

44. The method of claim 43, including the step of transferring heat from the heat storage device back to the catalytic converter before starting the engine that produces the exhaust gases when the catalytic converter temperature is less than its light-off temperature.

45. The method of claim 41, including the step of transferring the heat in the fluid to the passenger compartment of a motor vehicle that is powered by the engine that produces the exhaust gases.

46. The method of claim 41, including the step of transferring the heat in the fluid to a heat dissipator to dissipate the heat into the atmosphere.

* * * * *